(12) United States Patent  (10) Patent No.: US 9,003,380 B2
Cascaval et al.  (45) Date of Patent: Apr. 7, 2015

(54) EXECUTION OF DYNAMIC LANGUAGES VIA METADATA EXTRACTION

(75) Inventors: Gheorghe Calin Cascaval, Santa Clara, CA (US); Mehrdad H. Reshadi, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 622 days.

(21) Appl. No.: 12/862,560

(22) Filed: Aug. 24, 2010

(65) Prior Publication Data

US 2011/0173597 A1 Jul. 14, 2011

Related U.S. Application Data

(60) Provisional application No. 61/294,478, filed on Jan. 12, 2010.

(51) Int. Cl.
G06F 9/45 (2006.01)
G06F 9/455 (2006.01)
G06F 9/445 (2006.01)

(52) U.S. Cl.
CPC ........ G06F 9/45508 (2013.01); G06F 9/44505 (2013.01); G06F 9/45512 (2013.01)

(58) Field of Classification Search
CPC .................................................. G06F 9/45508
USPC ......................................................... 717/148
See application file for complete search history.

(56) References Cited

U.S. PATENT DOCUMENTS 6,263,376 B1 * 7/2001 Hatch et al. ................... 719/310
6,292,936 B1 * 9/2001 Wang ............................ 717/115
7,047,232 B1 * 5/2006 Serrano ................................. 1/1
2005/0091583 A1 4/2005 Goldberg
2005/0210198 A1 9/2005 Dimpsey et al.
2005/0234844 A1 * 10/2005 Ivanov ............................... 707/1
2006/0117307 A1 * 6/2006 Averbuch et al. ............. 717/143

(Continued)

FOREIGN PATENT DOCUMENTS

CN 1477558 A 2/2004
CN 1790267 A 6/2006

(Continued)

OTHER PUBLICATIONS

International Search Report and Written Opinion—PCT/US2011/020716—ISA/EPO—May 3, 2011.

(Continued)

*Primary Examiner* — Sujay Koneru

(57) ABSTRACT

Methods and devices for executing scripts written in a dynamic scripting language include parsing scripts in two stages, a pre-parse using a simplified grammar to generate script metadata regarding the high level structure of the script, and a full parse using the grammar and syntax of the dynamic scripting language and generated script metadata. The generated metadata may describe the high level structure that is present in the language of the script such as functions, object methods, and a top level call graph. The script metadata may be used during the full parse to determine the parts of the code to be fully parsed. The aspects minimize processing time spent in the parsing at run-time, and may eliminate processing required to interpret or compile sections of code that will not be executed. Script metadata as well as results of full parsing may also be cached to provide further processing efficiencies.

40 Claims, 8 Drawing Sheets

(56) References Cited

U.S. PATENT DOCUMENTS

| | | |
|---|---|---|
| 2006/0212440 A1 | 9/2006 | Heishi et al. |
| 2007/0073706 A1* | 3/2007 | Ebie et al. ............... 707/10 |
| 2007/0124373 A1 | 5/2007 | Chatterjee et al. |
| 2008/0229292 A1* | 9/2008 | Matsa et al. ............. 717/141 |
| 2009/0019105 A1* | 1/2009 | Sebastian ................ 709/202 |
| 2009/0271761 A1* | 10/2009 | Reynolds ................ 717/106 |
| 2010/0057468 A1* | 3/2010 | Lin et al. ................. 704/275 |
| 2010/0106790 A1* | 4/2010 | Shenfield ................ 709/206 |

FOREIGN PATENT DOCUMENTS

| | | |
|---|---|---|
| CN | 1834922 A | 9/2006 |
| CN | 101169718 A | 4/2008 |
| JP | 2007179153 A | 7/2007 |

OTHER PUBLICATIONS

Maly et al., "A Scriptable, Statistical Oracle for a Metadata Extraction System", Seventh International Conference on Quality Software, Oct. 11, 2007, XP31338269, Norfolk.

Furutani R., "JavaScript Engine Complete Comparison," Chapter 1, Comparison of JavaScript Engines, Web+DB Press, Japan, Gijutsu-Hyohron Co., Ltd., Jan. 25, 2009, vol. 48, pp. 145-147.

Koyama T., "Endnote Planning—Must Read for Beginners," PHP Atlas, Web+DB Press, Japan, Gijutsu-Hyohron Co., Ltd., Mar. 25, 2007, vol. 37, pp. Ex-4-Ex-5.

* cited by examiner

US 9,003,380 B2

EXECUTION OF DYNAMIC LANGUAGES VIA METADATA EXTRACTION

RELATED APPLICATIONS

This application claims the benefit of priority to U.S. Provisional Patent Application Ser. No. 61/294,478 entitled "Execution of Dynamic Languages via Metadata Extraction," filed on Jan. 12, 2010, the entire contents of which are hereby incorporated by reference.

FIELD OF THE INVENTION

This application relates generally to computing devices, and more particularly to methods for executing dynamic languages on computing devices.

BACKGROUND

Dynamic scripting languages are presently a preferred development platform in computer programming and software development. In particular, JavaScript® is the main development language for web pages and web applications on the client side, while Python and Ruby are very popular languages for software development on the server side. Such programming languages are designed for interactive execution (scripting), and are thus, by necessity, dynamic (i.e., support dynamic types, reflection and introspection, and extensibility). Dynamic scripting languages typically execute via interpretation, in which, at runtime, the scripts are parsed and analyzed before they are executed.

Recently, just-in-time compilation has been introduced for a number of these languages, such as JavaScript, to address performance issues of dynamic languages. However, performance problems persist. This is particularly the case in constrained computing environments, such as a mobile device, where the performance and power efficiency of executing dynamic languages continue to be issues.

SUMMARY OF THE INVENTION

Various aspects are presented for an apparatus, system, and method for executing a script written in a dynamic language. In one aspect, the script may be pre-parsed to identify high level program structures within the script and to generate metadata characterizing the identified high level structures. Such metadata may be used along with runtime information to determine the parts of the script that may need to be executed. In one aspect the parts that need to be executed may be fully parsed and used along with the generated metadata to generate bytecode. In various aspects the pre-parsed script may be executed. In one aspect execution of the script may be via interpretation. In another aspect executing the script may include generating executable code from the generated bytecode and executing generated executable code.

In an aspect, the generated metadata, the generated bytecode and/or the generated executable code may be stored in a cache. In an aspect, the script may be pre-parsed using a grammar that is simpler than the grammar used to fully parsing the parts that need to be executed. In an aspect, a script may be pre-parsed only when it is determined that the script has not been previously cached. In one aspect, a script may be fully parsed only when it is determined that the script has not been previously cached. In another aspect, executable code may be generated only when it is determined that executable code for the script has not been previously cached.

In another aspect, pre-parsing may be accomplished in a parallel processing operation. In an aspect, separate threads and/or processes may be used to execute the pre-parsing, metadata generation, code generation, program execution and/or caching operations. In an aspect, optimized threads and/or processes may be used to pre-fetch and analyze scripts that may require future execution. In an aspect the optimized threads or processes may use a speculative algorithm for the pre-fetch operation, whereby information regarding the current execution is used to anticipate future execution paths and to predict the sections of the code are likely to be executed in the future.

An aspect provides a method for executing a script written in a dynamic scripting language that includes pre-parsing the script to identify high level program structures within the script prior to execution, generating metadata characterizing the identified high level structures, using runtime information and metadata to determine parts of the script that need to execute, fully parsing the parts of the script using the generated metadata to generate bytecode, and executing the script. In such a method, pre-parsing the script may be accomplished using a grammar that is simpler than the grammar used in fully parsing the parts of the script. In an aspect, the script may be executed via interpretation. In another aspect, executing the script may include generating executable code from the generated bytecode and executing the generated executable code. In an aspect, the method may further include caching the generated metadata, caching the generated bytecode, and/or caching the generated executable code. This aspect may further include determining whether the script has been cached and pre-parsing the script when it is determined that the script has not been previously cached, determining whether the script has been fully parsed and parsing the parts of the script when it is determined that the script has not been previously fully parsed and/or determining whether executable code for the script has been cached and generating executable code when it is determined that executable code for the script has not been previously cached. In an aspect, the method operations of pre-parsing the script may be accomplished in a parallel processing operation.

A further aspect includes a computing device including a processor and a memory coupled to the processor in which the processor is configured with processor-executable instructions to perform operations including pre-parsing the script to identify high level program structures within the script prior to execution, generating metadata characterizing the identified high level structures, determining parts of the script that need to execute using runtime information and metadata, fully parsing the parts of the script using the generated metadata to generate bytecode, and executing the script. In an aspect, the processor may be configured with processor-executable instructions such that the script is executed via interpretation. In another aspect, the processor may be configured with processor-executable instructions such that executing the script includes generating executable code from the generated bytecode and executing the generated executable code. In a further aspect, the computing device memory and processor may be further configured to cache the generated metadata, the generated bytecode, and/or the generated executable code. In a further aspect, the processor may be further configured to determine whether the script has been cached, and determine parts of the script that need to execute using runtime information and metadata when it is determined that the script has not been previously cached. In a further aspect, the processor may be further configured to determine whether the script has been fully parsed, fully parse the parts of the script using the generated metadata to generate bytecode when it is determined that the script has not been previously fully parsed. In a further aspect, the processor may be further configured to determine whether executable code for the script has been cached, and generate executable code from the generated bytecode when it is determined that executable code for the script has not been previously cached. In an aspect, the processor may be configured to accomplish pre-parsing of the script in a parallel processing operation.

A further aspect includes a computing device that includes means for pre-parsing the script to identify high level program structures within the script prior to execution, means for generating metadata characterizing the identified high level structures, means for determining parts of the script that need to execute using runtime information and metadata, means for fully parsing the parts of the script using the generated metadata to generate bytecode, and means for executing the script. In a further aspect, the computing device may include means for executing the script via interpretation. In another aspect, the means for executing the script may include means for generating executable code from the generated bytecode and means for executing the generated executable code. In a further aspect, the computing device may include means for caching the generated metadata, means for caching the generated bytecode, and/or means for caching the generated executable code. In a further aspect, the computing device may further include means for determining whether the script has been cached, in which the means for determining parts of the script that need to execute using runtime information and metadata includes means for determining parts of the script that need to execute using runtime information and metadata when it is determined that the script has not been previously cached. In a further aspect, the computing device may further include means for determining whether the script has been fully parsed, in which the means for fully parsing the parts of the script using the generated metadata to generate bytecode includes means for fully parsing the parts of the script using the generated metadata to generate bytecode when it is determined that the script has not been previously fully parsed. In a further aspect, the computing device may further include means for determining whether executable code for the script has been cached, in which the means for generating executable code from the generated bytecode includes means for generating executable code from the generated bytecode when it is determined that executable code for the script has not been previously cached. In an aspect, the means for pre-parsing the script may include means for pre-parsing the script in a parallel processing operation.

A further aspect includes a non-transitory processor readable storage medium having stored thereon processor-executable instructions including at least one instruction for pre-parsing the script to identify high level program structures within the script prior to execution, at least one instruction for generating metadata characterizing the identified high level structures, at least one instruction for using runtime information and metadata to determine parts of the script that need to execute, at least one instruction for fully parsing the parts of the script using the generated metadata to generate bytecode, and at least one instruction for executing the script. In a further aspect, the non-transitory processor-readable storage medium may include at least one instruction for executing the script using interpretation. In another aspect, the at least one instruction for executing the script may include at least one instruction for generating executable code from the generated bytecode and at least one instruction for executing the generated executable code. In a further aspect, the stored processor-executable instructions may further include at least one instruction for caching the generated metadata, at least one instruction for caching the generated bytecode, and/or at least one instruction for caching the generated executable code. This aspect may further include at least one instruction for determining whether the script has been cached and pre-parsing the script when it is determined that the script has not been previously cached, at least one instruction for determining whether the script has been fully parsed and parsing the parts of the script when it is determined that the script has not been previously fully parsed, and/or at least one instruction for determining whether executable code for the script has been cached and generating executable code when it is determined that executable code for the script has not been previously cached. In an aspect, the stored processor-executable instructions may include at least one instruction for pre-parsing the script in a parallel processing operation.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1A:
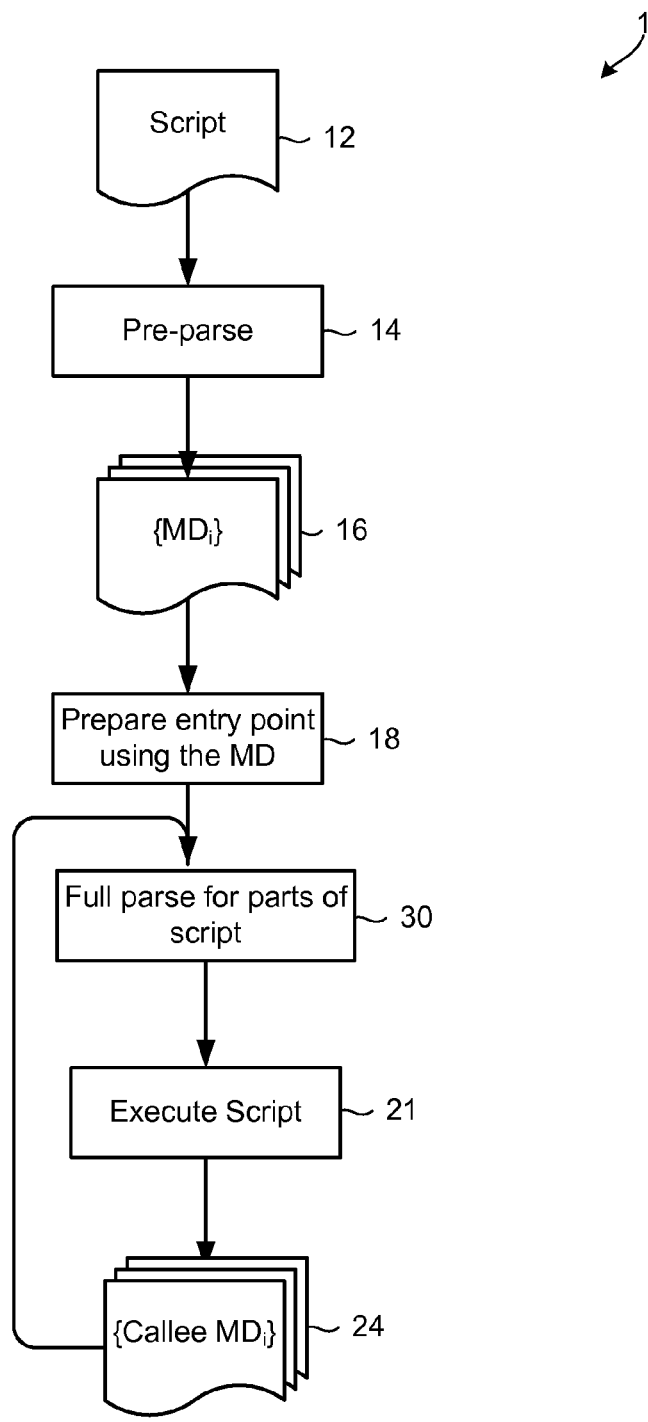
FIG. 1A is a process flow diagram of a method for executing a dynamic scripting language script.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" is used generically herein to refer to any one or all of servers, personal computers, mobile devices, cellular telephones, personal data assistants (PDA's), palm-top computers, wireless electronic mail receivers (e.g., the Blackberry® and Treo® devices), multi-media Internet enabled cellular telephones (e.g., the Blackberry Storm®), Global Positioning System (GPS) receivers, wireless gaming controllers, personal computers and similar personal electronic devices which include a programmable processor. While the various aspects are particularly useful in mobile devices, such as cellular telephones, which have limited processing power, the aspects are generally useful in any computing device that executes scripts and applications written in dynamic and/or scripting languages.

The terms "dynamic language" and "scripting language" are used generically and interchangeably in this application and may refer to any dynamic language, scripting language, or to any interpreted language used to write programs (herein as "scripts") that are interpreted and/or compiled at runtime. These terms may also refer to any language that runs on a managed runtime and is dynamically compiled. Thus, for the purposes of this application, the terms "dynamic language" and "scripting language" should not be limited to languages that are interpreted from source code or bytecode, or to those that execute along with programs that are traditionally compiled into native machine code. Examples of dynamic and scripting languages within the scope of this application include, for example, JavaScript, Perl, Python and Ruby, as well as Java and other languages that may be developed in the future.

The various aspects disclosed herein address performance problems which plague dynamic scripting languages due to their need to be parsed, analyzed and executed at the time of execution. The various aspects address the performance and power problems by taking advantage of the way dynamic languages are used and executed in most applications. In particular, the various aspects provide performance enhancements because scripts written in a dynamic language may contain large amounts of code that are not executed in all instances.

In static computer programming languages, an off-line compiler parses the whole program and generates an intermediate representation (IR) to represent the program structure. This IR typically carries extra information, such as annotations on the abstract syntax tree, which is used at code generation time to analyze the program to determine the parts of the program that are to be executed as well as the parts that are not to be executed in this activation (i.e., code that will never be executed because it is not reachable on any path from start to end of the program in the current implementation or activation circumstance). For ease of reference, all types of such annotations are referred to herein as metadata.

In dynamic languages, such as JavaScript, the parsing and compilation occurs at run-time, just before program execution. Parsing is the process of analyzing a text to determine its grammatical structure with respect to a given formal grammar, and in the interpretation of programs, parsing includes reading in the source script and converting it into an internal representation based on the language semantics of the program language. For most dynamic and/or scripting languages, parsing generates a bytecode representation of the program that is fed into an interpreter. The interpreter executes the bytecodes. In some implementations, the interpreter may also invoke a just-in-time compiler to generate machine code for selected portions of the code (such as functions). Therefore, the parsing and compilation processing time become part of the overall program execution time.

According to Microsoft research Technical Report MSR-TR-2009-173 "JSMeter: Characterizing Real-World Behavior of JavaScript Programs, dated December 2009 (http://research.microsoft.com/apps/pubs/default.aspx?id=15687), up to 70% of the code implemented in computing devices today will not execute in every implementation. This is due to many factors, including: data dependent execution (i.e., certain paths in the code executes only on the condition of certain inputs); error handling code (i.e., code that is executed only when an exception event occurs); and multiple algorithms designed to be selected based upon a particular operating environment or implementation. Thus, while programs written for computing devices often include elements for addressing a variety of uses or implementation circumstances, the code that is actually executed typically is limited to a particular implementation or call operation.

In dynamic languages, parsing and bytecode generation are performed as part of the execution processing. Thus, in dynamic languages, up to 70% of the processing time dedicated to parsing and bytecode generation of typical scripts (i.e., programs that a frequently used in the normal operation of a computing device) is consumed by code which may not be executed. The various aspects discussed below provide performance and power saving benefits for applications using dynamic scripting languages by avoiding the parsing and compilation of the unused parts of scripts (i.e., those parts of the code that will not execute in the current implementation or call circumstances).

The various aspects modify the execution of dynamic language scripts by splitting the parsing process into two stages. In the first stage, prior to runtime execution, a pre-parser executes an algorithm that uses a simplified grammar to parse the source code. In the second stage, at the time of execution, a full parser executes an algorithm using the formal grammar of the language to fully parse the source code so that it can be executed.

More particularly, in the first stage, the pre-parser uses a simple grammar to extract from the script the main features of the code, generating script metadata that describes the high level structure that is present in the language of the script. The script metadata may include functions, object methods, a top level call graph and various other high level structural details. The script metadata generated by the pre-parser may then be used by the full parser to identify the parts of the code that must be fully parsed with a complete language syntax and semantics. This two stage process is referred to herein as dynamic metadata extraction.

Dynamic metadata extraction minimizes processing time spent conducting the full parse at run-time. Dynamic metadata extraction also eliminates wasteful processing time and energy traditionally spent compiling sections of code that will not be executed. This is because traditional compilers/interpreters typically require fully parsing all of the code—including code that will never be executed due to data dependent execution, error handling code, multiple algorithms, and other inefficiencies.

The various aspects may be implemented on scripts written in practically any dynamic and/or scripting language. To develop a pre-parser for a particular language, a developer may identify the important structural properties of that language and use those properties to define a grammar that identifies only those important structural properties and pieces within a program script. A pre-parser may use this grammar to conduct a full parse only on a subset of the program. The defined grammar and identified structural properties may be used to identify the script elements that will not be executed. Thus, no change to the language or to the full parse grammar is required to implement the various aspects.

While the programming language and full parse grammar require no modifications, the aspects discussed below may include changes to the runtime processing of a script. These changes in the runtime processing may be made in such a manner so as to allow a system to take full advantage of the script metadata generated in the pre-parse operation. In other words, the full parsing operation that is performed prior to execution of a script may be modified to leverage the metadata generated by the pre-parsing operation. For example, in one aspect, a full parsing operation may use the class boundary information identified in the metadata to efficiently extract succinct portions of the code for the full grammar parsing operation.

FIG. 1A illustrates a first aspect method 1 for executing a script utilizing dynamic metadata extraction. In block 12, an executable script is loaded into, or accessed by, a computing device processor which performs a pre-parse in block 14.

During the pre-parsing block 14, a simplified grammar is used to identify the program's high level structural details and to extract key words identifying the various details. The script may be broken down into key words stored in the form of metadata. The metadata may then be grouped together in a logical fashion to form metadata blocks 16. The metadata may include, for example, class names, function names, the class or function's location, the length of the class or function, and other structural information identifying the boundaries of the language within the program. The processor may save the metadata blocks in a metadata file, as shown in block 16.

In block 18, the processor identifies an entry point of the metadata by identifying the metadata of the main part of the program. In block 18, the processor prepares the entry point into the script for execution of the program as called. At runtime, one or more objects or functions in the script will be called. These calls may be external to the script (such as in a web page that embeds JavaScript in HTML), or internal to the script (such as one function in the script calling another function). The process in block 18 of preparing the entry point allows for the runtime operation of identifying these points in the metadata and using the metadata information to invoke the full parse, compile, execute, etc. The parts or sections of the script identified by the metadata for execution may be given a full parse in block 30, in which the full grammar and syntax of the dynamic scripting language is applied to the script. In block 21, the script may be executed. While the code is executing, the processor may use the metadata blocks to identify the functions, methods, and variables that are likely to be used by the executing process, and begin to generate callee metadata in block 24. In one aspect the script is executed via interpretation in block 21. In another aspect discussed below with reference to FIG. 1B, executing the script includes generating executable code from the generated bytecode and executing generated executable code.

Figure 1B:
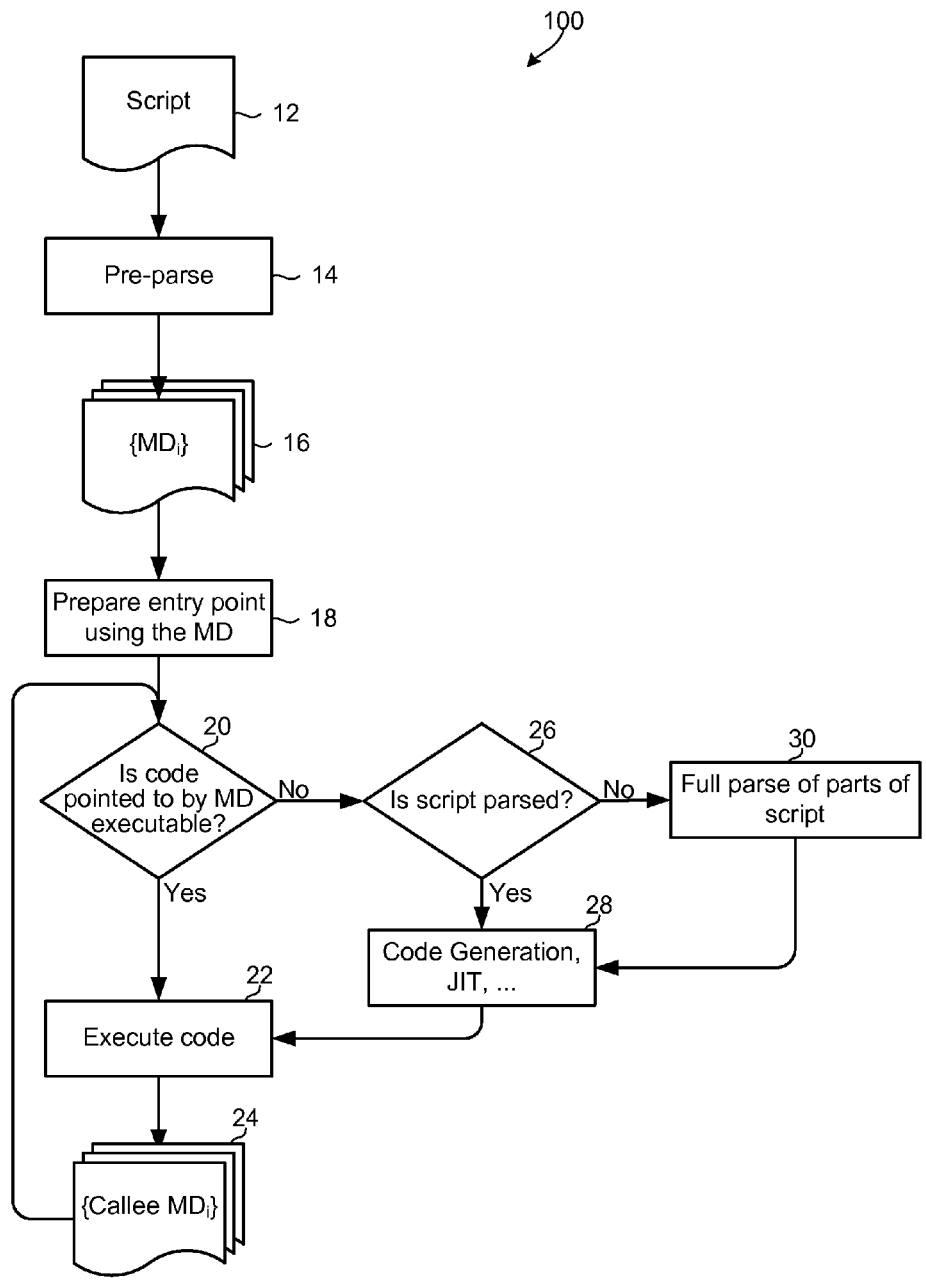
FIG. 1B is a process flow diagram of another method for executing a dynamic scripting language script.

FIG. 1B illustrates a second aspect method 100 for executing a script utilizing dynamic metadata extraction. In block 12, an executable script is loaded into, or accessed by, a computing device processor which performs a pre-parse in block 14. During the pre-parsing block 14, a simplified grammar is used to identify the program's high level structural details and to extract key words identifying the various details. The script may be broken down into key words stored in the form of metadata. The metadata may then be grouped together in a logical fashion to form metadata blocks 16. The metadata may include, for example, class names, function names, the class or function's location, the length of the class or function, and other structural information identifying the boundaries of the language within the program. The processor may save the metadata blocks in a metadata file, as shown in block 16. In one aspect, during later execution, only the class or function definitions identified in the metadata file may require full parsing. This full parsing may occur only when an object of an identified class type is created or if an identified function is called.

Figure 2:
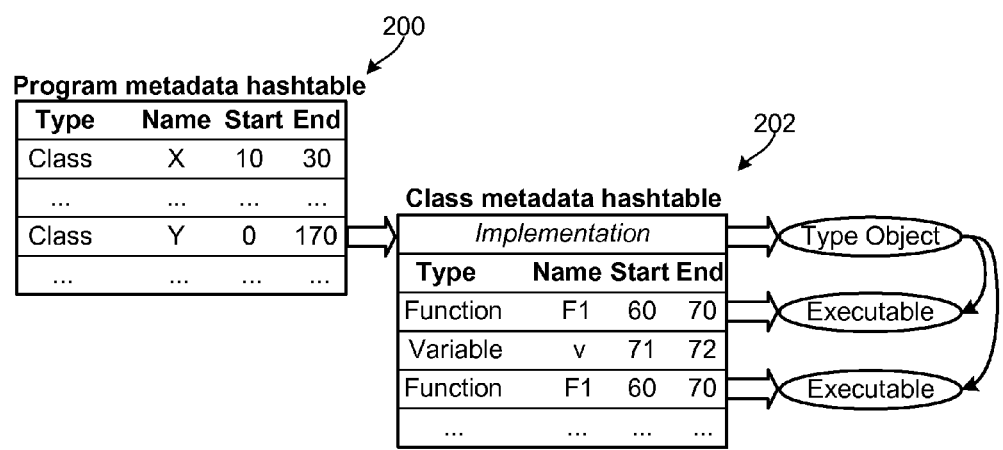
FIG. 2 illustrates a data structure suitable for use with an aspect of the invention.

A variety of different approaches may be used for accomplishing the pre-parsing operation and generating script metadata. In an example approach, the structure of a program or script may be considered to be formed by classes that include methods and variables. In such a construct, the top level functions and variables may belong to an implicit root class identified as an entry point. In such an example approach, the pre-parsing block 14 may identify the start and end locations of three types of constructs: (i) classes, (ii) functions, and (iii) variables. This information may be stored in a data structure similar to that shown in FIG. 2. In one aspect, the role of the pre-parser in block 14 is, ultimately, to initialize the metadata tables. In doing so, the pre-parser may find the boundary of classes in metadata table 200, and for each class, find the boundary of function and variable definitions for that class in metadata table 202. In the example illustrated in FIG. 2, the metadata tables are implemented as hash tables to allow for quick retrieval of information based on names.

Returning to FIG. 1B, in block 18, the processor identifies an entry point of the metadata by identifying the metadata of the main part of the program. In block 18, the processor prepares the entry point into the script for execution of the program as called. At runtime, one or more objects or functions in the script will be called. These calls may be external to the script (such as in a web page that embeds JavaScript in HTML), or internal (such as one function in the script calling another function). The process in block 18 of preparing the entry point allows for the runtime operation of identifying these points in the metadata and using the metadata information to invoke the full parse, compile, execute, etc.

During execution, the metadata gathered by the pre-parser in block 14 may be both used and updated concurrently. Using the runtime information obtained in block 18 (i.e., entry points) and the script metadata generated in the pre-parse block 14, the processor can efficiently determine the parts of the script that need to execute. This is also illustrated in FIG. 1B.

In block 20, the processor enters into a loop, in which, starting at the identified metadata entry point, the processor determines if code has already been generated and is ready for execution. If the generated code already exists (i.e., determination block 20="Yes"), the processor begins executing the generated code, as shown in block 22. While the code is executing, the processor uses the metadata blocks to identify the functions, methods, and variables that are likely to be used by the executing process, and begins to generate callee metadata, as shown in block 24. The callee metadata identifies the features that must be fully parsed for future execution. The processor may then return to block 20 to determine if the callee metadata points to code that has already been generated, and the process described above is repeated.

In an aspect, the determination shown in block 20 may include checks confirming that all of the previously compiled codes are still valid. In another aspect, block 20 may include checks confirming that the input parameters are still the same. In another aspect, block 20 may include other inspections validating the system's code and data integrity so as to avoid an execution error.

If the script or code pointed to by the metadata is not executable (i.e., determination block 20="No"), the processor may determine whether the script has been parsed in determination block 26. This determination may use information in the script metadata. If the script has previously been parsed (i.e., determination block 26="Yes"), the processor may proceed to code generation (i.e., generation of the bytecode) or compilation by a just-in-time compiler to produce executable metadata in block 28. The executable code may then be executed in block 22 as described above.

If the processor determines from the metadata that the script has not been parsed (i.e., determination block 26="No"), the parts or sections of the script identified by the metadata for execution may be given a full parse in block 30, in which the full grammar and syntax of the dynamic scripting language is applied to the script. As mentioned above, the process for conducting the full parse may utilize the script metadata generated in the pre-parse process block 14. Once the script has been through the full parse in block 30, the processor may proceed to code generation (i.e., generation of the bytecode) or compilation by a just-in-time compiler to produce executable code in block 28. The executable code is then linked in the metadata tables (or the metadata updated to point to the executable code) and executed in block 22 as described above.

In an aspect, multiple threads and/or processes may be used concurrently so as to exploit the full capabilities of multi-core processors and/or multi-processor systems. For instance, in block 26, if it is determined that the script has not yet been parsed, a separate process may be created to execute a full parse on the code segment. This allows the system continue processing the remaining scripts without having to wait for the full parse to complete. This use of multiple processes was not previously possible due to the serial nature of full parsers. Further, the complex syntax required to fully parse the scripts required access to global resources, making multi-process execution costly and difficult. However, by using a simplified syntax to pre-parse the scripts, the code may now be much more readily parallelized, and as a result, executed concurrently.

To recap method 100, during the execution phase, when an object of a certain class type is instantiated for the first time (i.e., determination blocks 20 and 26="No"), the full-parser analyzes the variable declarations using the full grammar in block 30 and may create a class Type Object that contains the variable information as well as the function stubs. Later during execution, as methods of the instantiated object are called, the full-parser analyzes the body of these functions (captured in the Class metadata hash table 200) and generates the executable code for that function (interpretation, just-in-time compilation, etc.) in block 28. At each block, the generated type and executable information may be linked back to the metadata information for later reuse. In subsequent object instantiation of an already-processed class type (i.e., determination block 26="Yes"), the parsing may be bypassed altogether and the type object may be used generate the executable code. Similarly, in subsequent calls to an already-processed function (i.e., determination block 20="Yes"), the parsing may be bypassed and the stored executable information executed in block 22.

In some languages such as JavaScript, a function may represent a class and its constructor. In such cases, during the execution, the metadata information may be updated by adding the class and its functions and variables information. Constructing this data requires a full parsing of the program source. However, in the various aspects, full parsing may only be accomplished when the code actually executes, and thus, there is little energy or performance overhead added by the aspects beyond that of the current way of processing which conducts a full parse in every case.

To speed up the metadata table lookups, the names in the program hash table 200 may be fully qualified. In other words, if the language supports nested classes or namespaces, the outer class/namespace name will be added to the inner class names as a prefix.

Depending on the pre-parser's simplified grammar, there may be cases that cannot be fully recognized by the pre-parse grammar. These cases can be added to the class metadata hash table as "variables" or a new category of "unknown." During full parsing, this information may be analyzed using the full language grammar and the metadata information updated accordingly.

Figure 3:
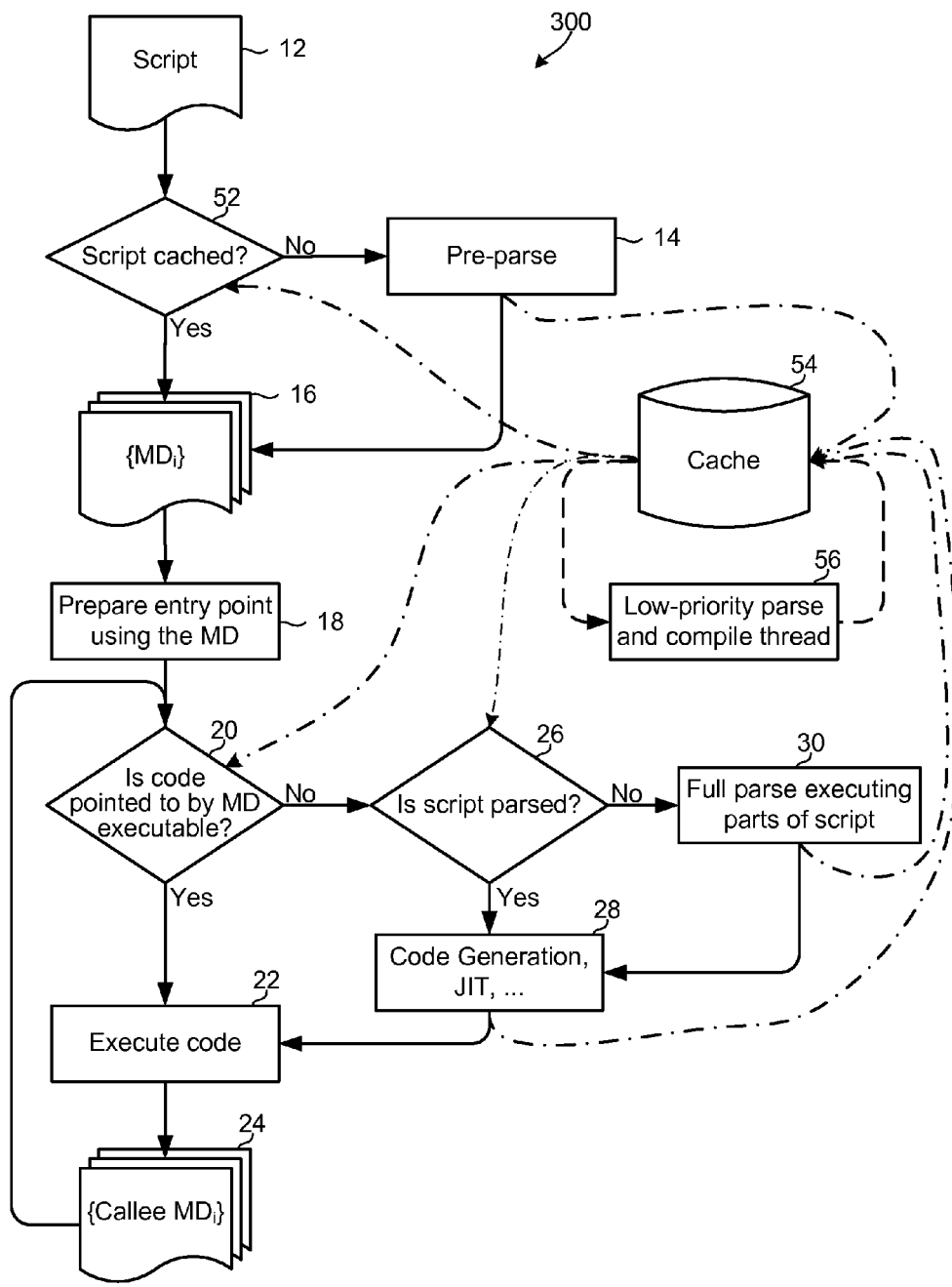
FIG. 3 is a process flow diagram of yet another method for executing a dynamic scripting language script.

A number of alternative aspects are envisioned that may build on the aspect described above with reference to FIGS. 1A, 1B and 2. In one aspect method 300 illustrated in FIG. 3, the script metadata generated in the pre-parse process block 14 may be stored in a cache memory 54 so that parsing can be avoided in subsequent executions of the same script program.

In this alternative method 300, when a script is accessed by a processor (e.g., part of a HTML page received in an HTTP message) the processor may determine whether the script has previously been cached in memory in determination block 52. To determine whether the script has previously been cached, the processor may access the cache 54 to determine whether script metadata has previously been stored in memory. If the script has not been previously cached (i.e., determination block 52="No"), the processor may perform the pre-parse process in block 14 to generate the script metadata 16 as described above with reference to FIG. 1B. The generated script metadata 16 is stored in the cache memory 54 as part of block 14. If the processor determines that the script has already been parsed and cached (i.e., determination block 52="Yes"), the processor may use the cached script metadata 16 to prepare the entry point metadata in block 18.

The cached script metadata 54 may be used for determining whether the script has been converted into executable code (i.e., code that is still executable) in determination block 20, as well as determining whether the script has previously been parsed in determination block 26, by the processor querying the cache 54 to obtain the metadata or receive an indication that bytecode or executable code is stored in the cache.

The script metadata cache 54 may also store the results of the full parse operation in block 30 as well as the executable code generated in block 28. Thus, the use of a metadata cache 54 may enable a processor to retain the full parse results or executable code so that when a particular script is encountered in the future, it can be directly executed using the cached executable code without performing the normal just-in-time analysis and compilation. In three alternative aspects, the metadata cache 54 may: store only the metadata generated by the pre-parsing block 14; store the bytecode including the metadata and the output of full parsing generated in block 30; or store the executable code generated in block 28 which would include the metadata, the output of full parsing, and the output of compilation. Caching of the binary metadata is more efficient than caching the script text itself. Hence, the above-mentioned process makes better use of cache resources.

In further aspects, the script metadata cache 54 may be maintained on the client machine for reuse by one or more applications, on a proxy server accessible by several client computers, or on a main server accessible by all client computers.

Maintaining a metadata cache 54 also permits another aspect in which the full parse operation 30 may be accomplished by an optimized low-priority process in an off-line or idle processor, as shown in block 56. Parsing done by an optimized low-priority process may enable the computing device to make full use of processor capability by performing some or all of the full parsing process of block 30 prior to runtime, with the generated bytecode stored in the cache 54. In another aspect, multiple threads and/or processes may do the full parsing step in the background while a main thread and/or process generates the current executable code, or executes previously parsed and compiled code, in the foreground.

In a further aspect, this prior processing of scripts may include compiling threads in block 56 which are also stored in the cache 54 for use at run time to minimize the amount of code generation or compilation required in block 28. In this aspect, a low-priority off-line thread can process through the program call graph and pre-compile the code by parsing the text and generating executable code for parts of the program that are most likely to be executed in the near future. This process can be done in the background, such as on a limited program scope. Doing so may accelerate script execution by minimizing the amount of compilation that has to be accomplished at run time.

Figure 4:
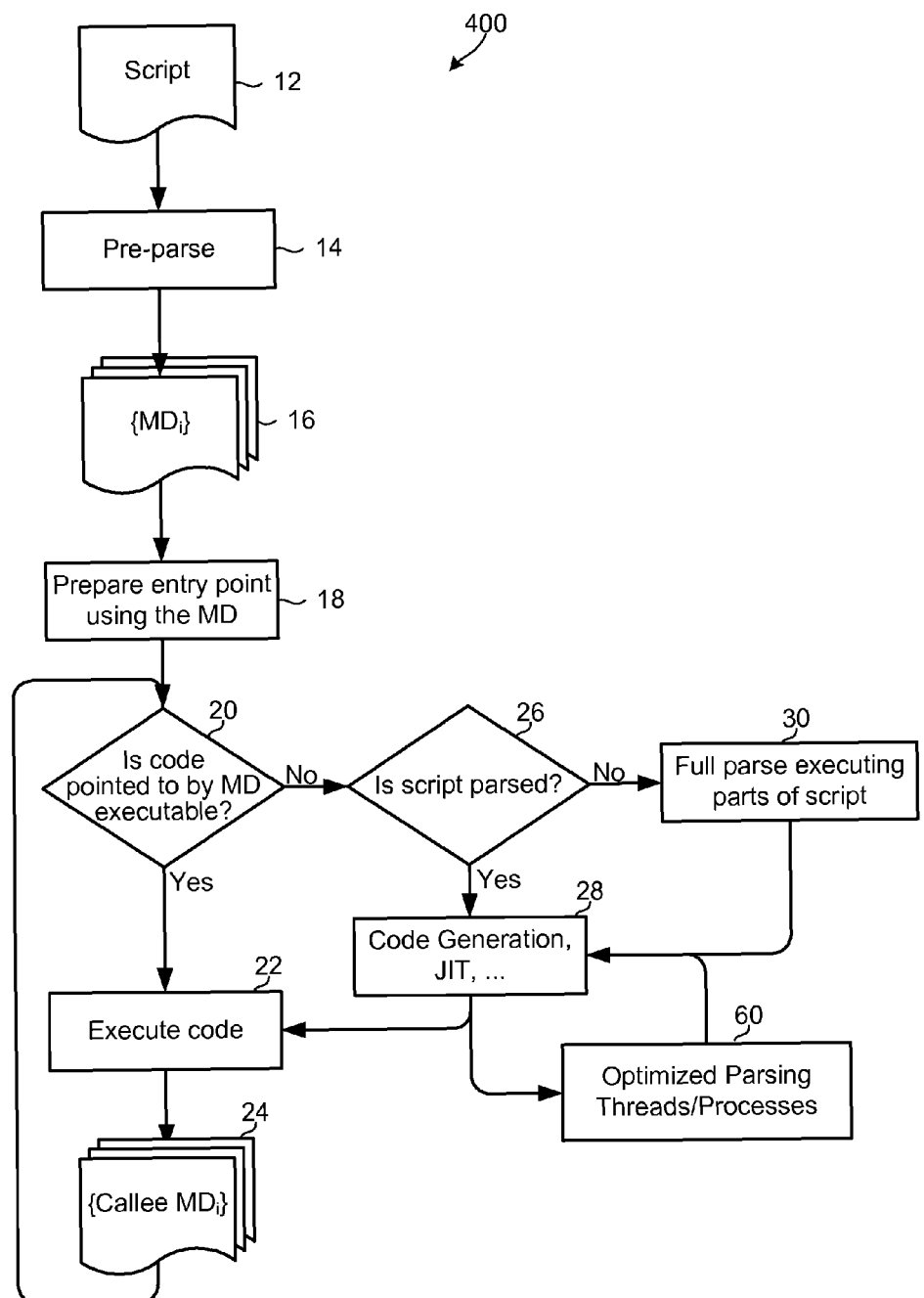
FIG. 4 is a process flow diagram of another method for executing a dynamic scripting language script.

In another aspect, a method 400 illustrated in FIG. 4 may include separate optimized threads and/or processes that are dedicated to the parsing operation. Method 400 includes the same operations as described above with reference to FIG. 1B with addition of block 60 including optimized parsing or thread generation processes associated with code generation in block 28. These optimized parsing threads/processes in block 60 may pre-fetch and analyze scripts that may require execution in the future. The optimized threads/processes in block 60 may use a deterministic or speculative algorithm for the pre-fetch operation, whereby information regarding the current execution is used to anticipate future execution paths, and to predict the sections of the code that are likely to be needed in the future. These algorithms may execute concurrently with the main process at runtime. These algorithms may be used to determine future execution paths based on information gathered from the current execution. These algorithms may be implemented in such a manner as to maximize execution speed and power efficiency.

In one aspect, a speculative algorithm may be used in block 60 based on heuristics in which previous executions and/or previous periods of execution are analyzed to predict the future execution path. Such a speculative algorithm may use "meet-predict" logic to generate a confidence interval, which may be used to identify the scripts that are likely to be required in future executions. In another aspect, a deterministic algorithm may be used in block 60 to pre-fetch scripts based on the execution state and the execution requirements of the current execution. For instance, if the current execution is executing function X, and the metadata identifies function X as requiring calls to functions Y and Z, an optimized thread may pre-fetch functions Y and Z, and parse them while the main thread executes function X. In another aspect, a combination of speculative and deterministic algorithms may be used in block 60.

The various aspects provide a simple metadata grammar used in the pre-parsing process which may be more amenable to being performed in parallel, such as on a parallel processor computing device. Since the pre-parse operations identify only the main structural components of a script program, the processing of a script may be allocated to more than one processor, and executed in parallel. Further, since the complexity and difficulty of parallelizing depends on the complexity of the grammar of the language, the use of a simplified syntax greatly simplifies parallelizing the code. Thus, the aspects may be particularly well suited for use on multi-core processors and/or multi-processor computer architectures. Additionally, the output of the pre-parse process may yield metadata that can enable a multicore processor to execute portions of the program in parallel. By identifying the major structural elements in the pre-parse prior to runtime, the generation of executable code may be accomplished in such a manner as to allow those portions that may be executed in parallel to be separately generated and allocated to parallel processors.

The various aspects provide a number of technical advantages over current methods for executing dynamic languages. These advantages include: faster parsing of whole scripts using a simpler grammar; reduced processing required for overall program execution and hence better performance and less energy consumption; a parsing grammar that is easier to optimize and parallelize; and enabling the parsing and execution processes to run in parallel using the call-graph parser thread.

The aspects may be implemented on any of a variety of computing devices, such as mobile computing devices, such as multifunction cellular telephones, and personal computers. The aspects may be particularly helpful in computing devices with relatively limited processing capabilities which can benefit from the performance savings enabled by pre-parsing scripts.

Figure 5:
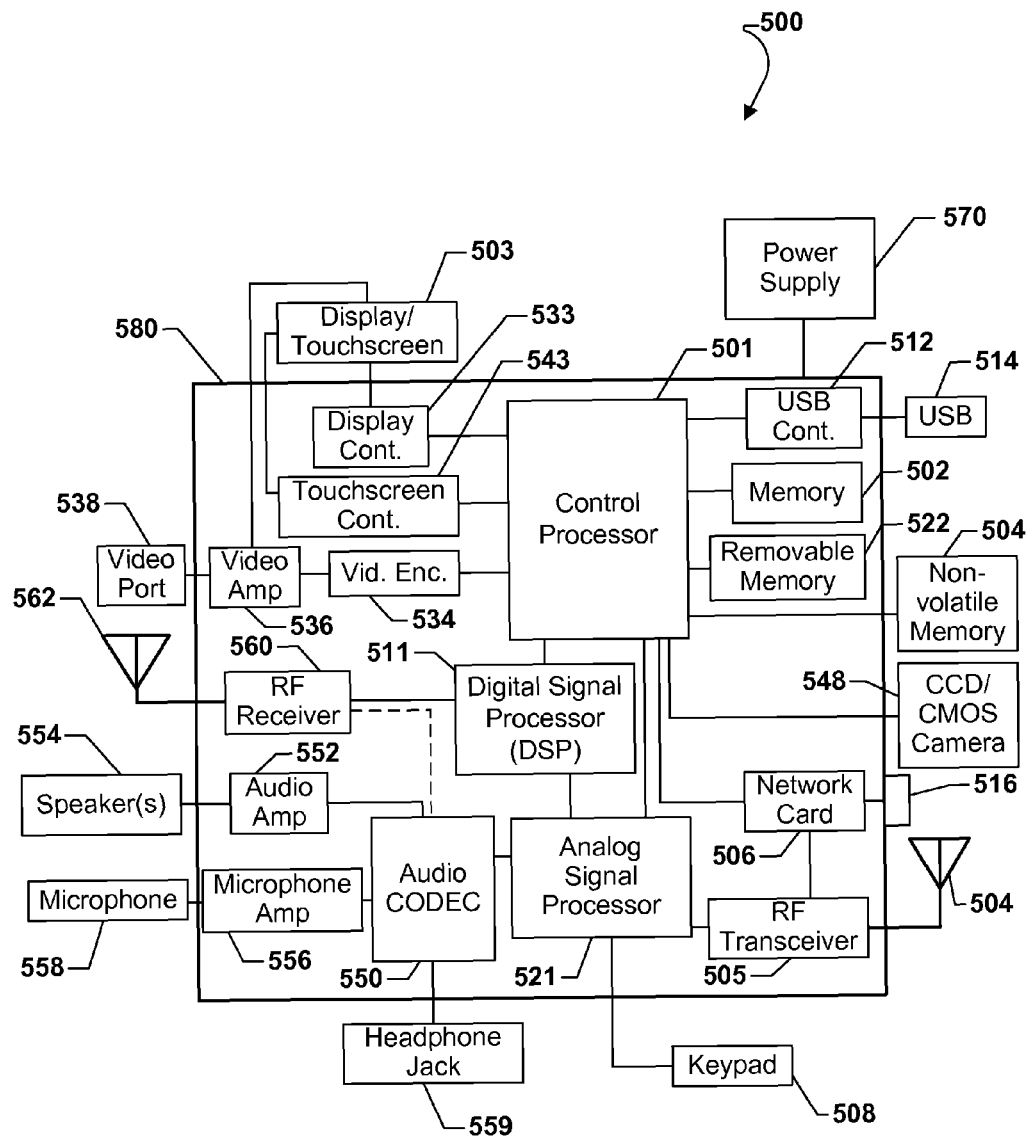
FIG. 5 is a component block diagram of computing device suitable for use with the various aspects.

Example components and modules of an exemplary, non-limiting aspect of such a computing device 500 are illustrated in FIG. 5. A computing device 500 may include circuit board 580 of electronic components, some or all of which may be integrated into an on-chip system, that includes a control processor 501 coupled to memory 502. The control processor 501 may further be coupled to a digital signal processor 511 and/or an analog signal processor 521, which also be coupled together. In some embodiments, the control processor 501 and a digital signal processor 511 may be the same component or may be integrated into the same processor chip. A display controller 533 and a touchscreen controller 543 may be coupled to the control processor 501 and to display or touchscreen display 503 within or connected to the computing device 500.

The control processor 501 may also be coupled to removable memory 522 (e.g., an SD memory or SIM card in the case of mobile computing devices) and/or to external memory 504, such as one or more of a disk drive, CD drive, and a DVD drive. The control processor 501 may also be coupled to a Universal Serial Bus (USB) controller 512 which couples to a USB port 514. Also, a power supply 570 may be coupled to the circuit board 580 through the USB controller 512 or through different electrical connections to provide power (e.g., DC power) to the various electronic components.

The control processor 501 may also be coupled to a video encoder 534, e.g., a phase alternating line (PAL) encoder, a sequential couleur a memoire (SECAM) encoder, or a national television system(s) committee (NTSC) encoder. Further, the video encoder 534 may be coupled to a video amplifier 536 which may be coupled to the video encoder 534 and the display or touchscreen display 503. Also, a video port 538 may be coupled to the video amplifier 536 to enable connecting the computing device 500 to an external monitor, television or other display (not shown).

In some embodiments, particularly mobile computing devices, the control processor 501 may be coupled to a radio frequency (RF) transceiver 505, such as via an analog signal processor 521. The RF transceiver 505 may be coupled to an RF antenna 504 for transmitting and receiving RF signals. The RF transceiver 505 may be configured to transmit and receive communication signals of one or more different wireless communication protocols including, for example, cellular telephone (e.g., G-3, UMTS, CDMA, etc.), WiFi, WiMax, and BlueTooth.

The control processor 501 may further be coupled to a network card 506 which may be coupled to a network connector 516 and/or the RF transceiver 505 and configured to enable communications via an external network (e.g., local area networks, the Internet, an intranet, WiFi networks, BlueTooth networks, personal area network (PAN) etc.) The network card 506 may be in the form of a separate chip or card, or may be implemented as part of the control processor 501 or the RF transceiver 505 (or both) as a full solution communication chip.

A number of analog devices may be coupled to the control processor 501 via the analog signal processor 521, such as a keypad 508 as shown in FIG. 5. In other implementations, a keypad or keyboard may include its own processor so that the interface with the control processor 501 may be via direct connection (not shown), via a network connection (e.g., via the network card), or via the USB port 514.

In some implementations, a digital camera 548 may be coupled to the control processor 501. In an exemplary aspect the digital camera 548 may be a charge-coupled device (CCD) camera or a complementary metal-oxide semiconductor (CMOS) camera. The digital camera 548 may be built into the computing device 500 or coupled to the device by an external cable.

In some implementations, an audio CODEC 550 (e.g., a stereo CODEC) may be coupled to the analog signal processor 521 and configured to send sound signals to one or more speakers 554 via an audio amplifier 552. The audio CODEC 550 may also be coupled to a microphone amplifier 556 which may be coupled to a microphone 558 (e.g., via a microphone jack). A headphone jack 559 may also be coupled to the audio CODEC 550 for outputting audio to headphones.

In some implementations, the computing device 500 may include a separate RF receiver circuit 560 which may be coupled to an antenna 562 for receiving broadcast wireless communication signals. The receiver circuit 560 may be configured to receive broadcast television signals (e.g., FLO TV broadcasts), and provide received signals to the DSP 511 for processing. In some implementations, the receiver circuit 560 may be configured to receive FM radio signals, in which case the received signals may be passed to the Audio CODEC 550 for processing.

In an aspect, processor-executable instructions for accomplishing one or more of the method operations described above may be stored in the internal memory 502, removable memory 522 and/or non-volatile memory 504 (e.g., as on a hard drive, CD drive, or other storage accessible via a network). Such processor-executable instructions may be executed by the control processor 501 in order to perform the methods described herein.

Figure 6:
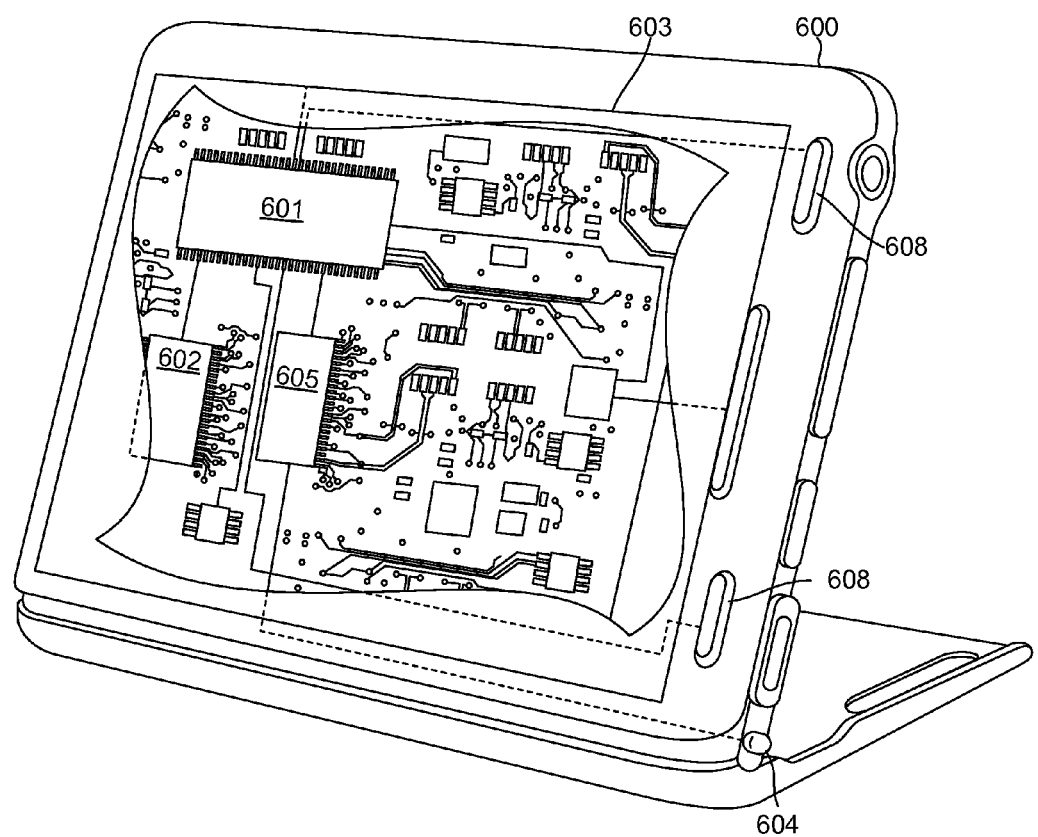
FIG. 6 is an illustration of an example mobile device suitable for use with the various aspects.

An example of a mobile computing device is illustrated in FIG. 6, and an example of a notebook computer is illustrated in FIG. 13. Typical mobile computing devices 600 will have in common the components illustrated in FIG. 6. For example, mobile computing devices 600 may include a processor 601 coupled to internal memory 602 and a touch surface input device/display 603. The touchscreen display 603, such as a resistive-sensing touchscreen, capacitive-sensing touchscreen, infrared sensing touchscreen, acoustic/piezoelectric sensing touchscreen, or the like. The various aspects are not limited to any particular type of touchscreen display 603 or touchpad technology. Additionally, the computing device 600 may have an antenna 604 for sending and receiving electromagnetic radiation that is connected to a wireless data link and/or cellular telephone transceiver 605 coupled to the processor 601. Computing devices 600 may also include physical buttons 608 for receiving user inputs.

Figure 7:
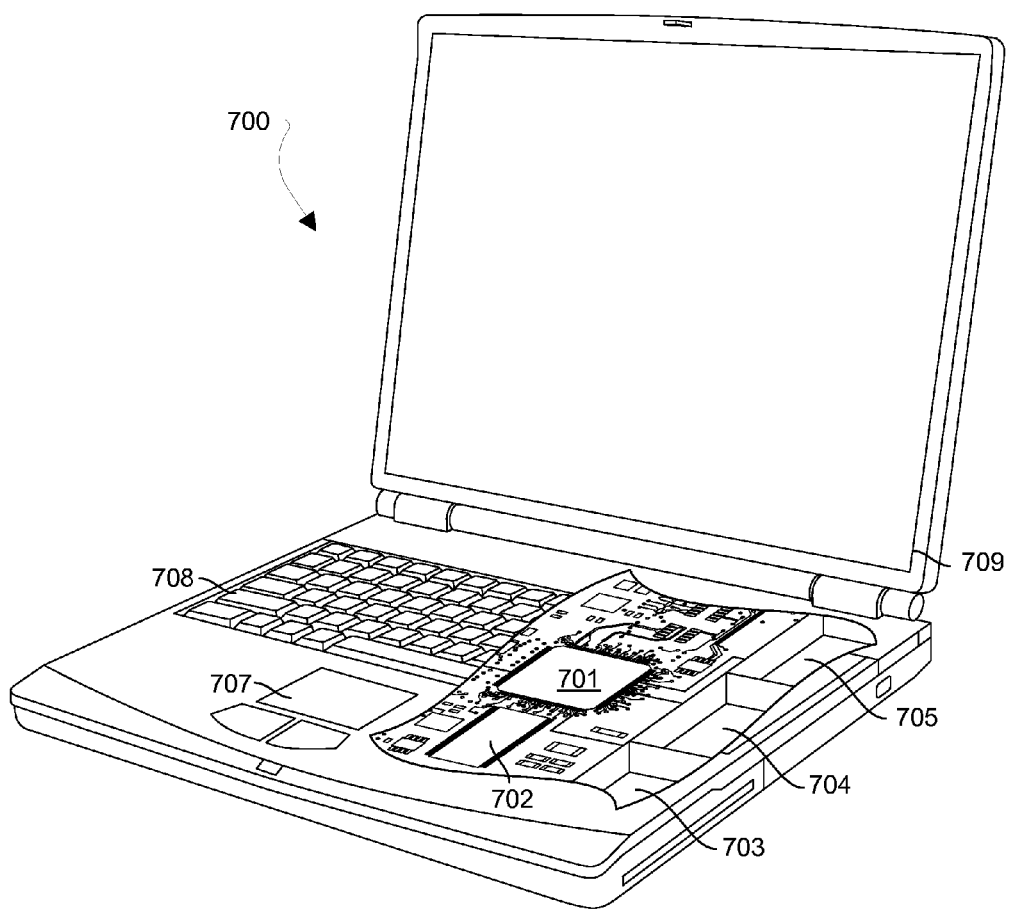
FIG. 7 is an illustration of an example personal computer suitable for use with the various aspects.

While the various aspects may provide significant performance enhancements for mobile computing devices, other forms of computing devices, including personal computers and laptop computers, may also benefit from pre-parsing of the dynamic language scripts. Such computing devices typically include the components illustrated in FIG. 7 which shows a typical personal laptop computer 700. Such a personal computer 700 typically includes a processor 701 coupled to volatile memory 702 and a large capacity nonvolatile memory, such as a disk drive 703. The computer 700 may also include a compact disc (CD) and/or DVD drive 704 coupled to the processor 701. The computer device 700 may also include a number of connector ports coupled to the processor 601 for establishing data connections or receiving external memory devices, such as a network connection circuit 705 for coupling the processor 601 to a network. The computer 700 may further be coupled to a keyboard 708, a pointing device such as a mouse 707, and a display 709 as is well known in the computer arts.

The processor 601, 701 may be any programmable microprocessor, microcomputer or multiple processor chip or chips that can be configured by software instructions (applications) to perform a variety of functions, including the functions of the various aspects described herein. In some mobile devices, multiple processors 601, 701 may be provided, such as one processor dedicated to wireless communication functions and one processor dedicated to running other applications. Typically, software applications may be stored in the internal memory 602, 702 before they are accessed and loaded into the processor 601, 701. In some mobile devices, the processor 601, 701 may include internal memory sufficient to store the application software instructions. In some mobile devices, the secure memory may be in a separate memory chip coupled to the processor 601, 701. The internal memory 602, 702 may be a volatile or nonvolatile memory, such as flash memory, or a mixture of both. For the purposes of this description, a general reference to memory refers to all memory accessible by the processor 601, 701, including internal memory 602, 702, removable memory plugged into the mobile device, and memory within the processor 601, 701 itself.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable or processor-readable storage medium. The steps of a method or algorithm disclosed herein may be embodied in a processor-executable software module which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of processing a script written in a dynamic scripting language, comprising:
    pre-parsing the script with a processor to identify high level program structures within the script prior to runtime;
    generating, with the processor, metadata characterizing the identified high level program structures prior to runtime;
    using, in the processor, runtime information and the generated metadata to determine parts of the script that need to execute;
    fully parsing the parts of the script, with the processor, using the generated metadata to generate bytecode;
    executing the generated bytecode in the processor;
    caching the generated bytecode;
    caching the generated metadata;
    determining, in the processor, during a subsequent runtime execution of the script whether the script has been previously fully parsed;
    using, in the processor, subsequent runtime information and the cached generated metadata to determine subsequent parts of the script that need to execute;
    executing, in the processor, the cached generated bytecode corresponding to the subsequent parts of the script that need to execute when it is determined that the script has been previously fully parsed;
    fully parsing the subsequent parts of the script that need to execute, with the processor, using the cached generated metadata to generate subsequent bytecode when it is determined that the script has not been previously fully parsed; and
    executing the subsequent bytecode in the processor when it is determined that the script has not been previously fully parsed.

2. The method of claim 1, wherein the generated bytecode is executed via interpretation.

3. The method of claim 1, wherein pre-parsing the script is accomplished using a grammar that is simpler than the grammar used in fully parsing the parts of the script.

4. The method of claim 1,
    wherein pre-parsing the script is accomplished in a parallel processing operation.

5. The method of claim 1, wherein executing the generated bytecode in the processor comprises:
    generating, in the processor, executable code from the generated bytecode; and
    executing the generated executable code in the processor.

6. The method of claim 5, further comprising caching the generated executable code.

7. A computing device, comprising:
    a processor; and
    a memory coupled to the processor,
    wherein the processor is configured with processor-executable instructions to perform operations comprising:
        pre-parsing a script written in a dynamic scripting language to identify high level program structures within the script prior to runtime;
        generating metadata characterizing the identified high level program structures prior to runtime;
        using runtime information and the generated metadata to determine parts of the script that need to execute;
        fully parsing the parts of the script using the generated metadata to generate bytecode;
        executing the generated bytecode;
        caching the generated bytecode;
        caching the generated metadata;
        determining during a subsequent runtime execution of the script whether the script has been previously fully parsed;
        using subsequent runtime information and the cached generated metadata to determine subsequent parts of the script that need to execute;
        executing the cached generated bytecode corresponding to the subsequent parts of the script that need to execute when it is determined that the script has been previously fully parsed;
        fully parsing the subsequent parts of the script that need to execute using the cached generated metadata to generate subsequent bytecode when it is determined that the script has not been previously fully parsed; and
        executing the subsequent bytecode when it is determined that the script has not been previously fully parsed.

8. The computing device of claim 7, wherein the processor is configured with processor-executable instructions such that the generated bytecode is executed via interpretation.

9. The computing device of claim 7, wherein the processor is configured with processor-executable instructions such that pre-parsing the script is accomplished using a grammar that is simpler than the grammar used in fully parsing the parts of the script.

10. The computing device of claim 7, wherein the processor is configured with processor-executable instructions such that pre-parsing the script is accomplished in a parallel processing operation.

11. The computing device of claim 7, wherein the processor is configured with processor-executable instructions such that executing the generated bytecode comprises:
 generating executable code from the generated bytecode; and
 executing the generated executable code.

12. The computing device of claim 11, wherein the processor is configured with processor-executable instructions to perform operations further comprising caching the generated executable code.

13. A computing device, comprising:
 means for pre-parsing a script written in a dynamic scripting language to identify high level program structures within the script prior to runtime;
 means for generating metadata characterizing the identified high level program structures prior to runtime;
 means for determining parts of the script that need to execute using runtime information and the generated metadata;
 means for fully parsing the parts of the script using the generated metadata to generate bytecode;
 means for executing the generated bytecode;
 means for caching the generated bytecode means for caching the generated metadata;
 means for determining during a subsequent runtime execution of the script whether the script has been previously fully parsed;
 means for using subsequent runtime information and the cached generated metadata to determine subsequent parts of the script that need to execute;
 means for executing the cached generated bytecode corresponding to the subsequent parts of the script that need to execute when it is determined that the script has been previously fully parsed;
 means for fully parsing the subsequent parts of the script that need to execute using the cached generated metadata to generate subsequent bytecode when it is determined that the script has not been previously fully parsed; and
 means for executing the subsequent bytecode when it is determined that the script has not been previously fully parsed.

14. The computing device of claim 13, wherein means for executing the generated bytecode comprises means for executing the generated bytecode via interpretation.

15. The computing device of claim 13, wherein means for pre-parsing the script comprises means for pre-parsing the script using a grammar that is simpler than the grammar used in fully parsing the parts of the script.

16. The computing device of claim 13, wherein means for pre-parsing the script comprises means for pre-parsing the script in a parallel processing operation.

17. The computing device of claim 13, wherein means for executing the generated bytecode comprises:
 means for generating executable code from the generated bytecode; and
 means for executing the generated executable code.

18. The computing device of claim 17, further comprising means for caching the generated executable code.

19. A non-transitory processor-readable storage medium having stored thereon processor-executable instructions configured to cause a processor to perform operations comprising:
 pre-parsing a script written in a dynamic scripting language to identify high level program structures within the script prior to runtime;
 generating metadata characterizing the identified high level program structures prior to runtime;
 using runtime information and the generated metadata to determine parts of the script that need to execute;
 fully parsing the parts of the script using the generated metadata to generate bytecode;
 executing the generated bytecode;
 caching the generated bytecode caching the generated metadata;
 determining during a subsequent runtime execution of the script whether the script has been previously fully parsed;
 using subsequent runtime information and the cached generated metadata to determine subsequent parts of the script that need to execute;
 executing the cached generated bytecode corresponding to the subsequent parts of the script that need to execute when it is determined that the script has been previously fully parsed;
 fully parsing the subsequent parts of the script that need to execute using the cached generated metadata to generate subsequent bytecode when it is determined that the script has not been previously fully parsed; and
 executing the subsequent bytecode when it is determined that the script has not been previously fully parsed.

20. The non-transitory processor-readable storage medium of claim 19, wherein the stored processor-executable instructions are configured to cause a processor to perform operations such that executing the generated bytecode comprises executing the generated bytecode via interpretation.

21. The non-transitory processor-readable storage medium of claim 19, wherein the stored processor-executable instructions are configured to cause a processor to perform operations such that pre-parsing the script comprises pre-parsing the script using a grammar that is simpler than the grammar used in fully parsing the parts of the script.

22. The non-transitory processor-readable storage medium of claim 19, wherein the stored processor-executable instructions are configured to cause a processor to perform operations such that pre-parsing the script comprises pre-parsing the script in a parallel processing operation.

23. The non-transitory processor-readable storage medium of claim 19, wherein the stored processor-executable instructions are configured to cause a processor to perform operations such that executing the generated bytecode comprises:
 generating executable code from the generated bytecode; and
 executing the generated executable code.

24. The non-transitory processor-readable storage medium of claim 23, wherein the stored processor-executable instructions are configured to cause a processor to perform operations further comprising:
 caching the generated executable code.

25. A method of processing a script written in a dynamic scripting language, comprising:
 pre-parsing the script with a processor to identify high level program structures within the script prior to runtime;
 generating, with the processor, metadata characterizing the identified high level program structures prior to runtime;

using, in the processor, runtime information and the generated metadata to determine parts of the script that need to execute;
fully parsing the parts of the script, with the processor, using the generated metadata to generate bytecode;
generating, in the processor, executable code from the generated bytecode;
executing the generated executable code in the processor;
caching the generated metadata;
caching the generated executable code;
using, in the processor, subsequent runtime information and the cached generated metadata to determine subsequent parts of the script that need to execute;
determining, in the processor, whether the cached generated executable code corresponds to the subsequent parts of the script that need to execute;
executing the cached generated executable code in the processor when it is determined that the cached generated executable code corresponds to the subsequent parts of the script that need to execute;
fully parsing the subsequent parts of the script, with the processor, using the cached generated metadata to generate subsequent bytecode when it is determined that the cached generated executable code does not correspond to the subsequent parts of the script that need to execute;
generating, in the processor, subsequent executable code from the generated subsequent bytecode; and
executing the generated subsequent executable code in the processor.

26. The method of claim 25, wherein pre-parsing the script is accomplished using a grammar that is simpler than the grammar used in fully parsing the parts of the script.

27. The method of claim 25, further comprising caching the generated bytecode.

28. The method of claim 25, wherein pre-parsing the script is accomplished in a parallel processing operation.

29. A computing device, comprising:
a processor; and
a memory coupled to the processor,
wherein the processor is configured with processor-executable instructions to perform operations comprising:
pre-parsing a script written in a dynamic scripting language to identify high level program structures within the script prior to runtime;
generating metadata characterizing the identified high level program structures prior to runtime;
using runtime information and the generated metadata to determine parts of the script that need to execute;
fully parsing the parts of the script using the generated metadata to generate bytecode;
generating executable code from the generated bytecode;
executing the generated executable code;
caching the generated metadata;
caching the generated executable code;
using subsequent runtime information and the cached generated metadata to determine subsequent parts of the script that need to execute;
determining whether the cached generated executable code corresponds to the subsequent parts of the script that need to execute;
executing the cached generated executable code when it is determined that the cached generated executable code corresponds to the subsequent parts of the script that need to execute;
fully parsing the subsequent parts of the script using the cached generated metadata to generate subsequent bytecode when it is determined that the cached generated executable code does not correspond to the subsequent parts of the script that need to execute;
generating subsequent executable code from the generated subsequent bytecode; and
executing the generated subsequent executable code.

30. The computing device of claim 29, wherein the processor is configured with processor-executable instructions such that pre-parsing the script is accomplished using a grammar that is simpler than the grammar used in fully parsing the parts of the script.

31. The computing device of claim 29, wherein the processor is configured with processor-executable instructions to perform operations further comprising caching the generated bytecode.

32. The computing device of claim 29, wherein the processor is configured with processor-executable instructions such that pre-parsing the script is accomplished in a parallel processing operation.

33. A computing device, comprising:
means for pre-parsing a script written in a dynamic scripting language to identify high level program structures within the script prior to runtime;
means for generating metadata characterizing the identified high level program structures prior to runtime;
means for determining parts of the script that need to execute using runtime information and the generated metadata;
means for fully parsing the parts of the script using the generated metadata to generate bytecode means for fully parsing the parts of the script using the generated metadata to generate bytecode;
means for generating executable code from the generated bytecode;
means for executing the generated executable code;
means for caching the generated metadata;
means for caching the generated executable code;
means for using subsequent runtime information and the cached generated metadata to determine subsequent parts of the script that need to execute;
means for determining whether the cached generated executable code corresponds to the subsequent parts of the script that need to execute;
means for executing the cached generated executable code when it is determined that the cached generated executable code corresponds to the subsequent parts of the script that need to execute;
means for fully parsing the subsequent parts of the script using the cached generated metadata to generate subsequent bytecode when it is determined that the cached generated executable code does not correspond to the subsequent parts of the script that need to execute;
means for generating subsequent executable code from the generated subsequent bytecode; and
means for executing the generated subsequent executable code.

34. The computing device of claim 33, wherein means for pre-parsing the script comprises means for pre-parsing the script using a grammar that is simpler than the grammar used in fully parsing the parts of the script.

35. The computing device of claim 33, further comprising means for caching the generated bytecode.

36. The computing device of claim 33, wherein means for pre-parsing the script comprises means for pre-parsing the script in a parallel processing operation.

37. A non-transitory processor-readable storage medium having stored thereon processor-executable instructions configured to cause a processor to perform operations comprising:
- pre-parsing a script written in a dynamic scripting language to identify high level program structures within the script prior to runtime;
- generating metadata characterizing the identified high level program structures prior to runtime;
- using runtime information and the generated metadata to determine parts of the script that need to execute;
- fully parsing the parts of the script using the generated metadata to generate bytecode;
- generating executable code from the generated bytecode;
- executing the generated executable code;
- caching the generated metadata;
- caching the generated executable code;
- using subsequent runtime information and the cached generated metadata to determine subsequent parts of the script that need to execute;
- determining whether the cached generated executable code corresponds to the subsequent parts of the script that need to execute;
- executing the cached generated executable code when it is determined that the cached generated executable code corresponds to the subsequent parts of the script that need to execute;
- fully parsing the subsequent parts of the script using the cached generated metadata to generate subsequent bytecode when it is determined that the cached generated executable code does not correspond to the subsequent parts of the script that need to execute;
- generating, subsequent executable code from the generated subsequent bytecode; and
- executing the generated subsequent executable code.

38. The non-transitory processor-readable storage medium of claim 37, wherein the stored processor-executable instructions are configured to cause a processor to perform operations such that pre-parsing the script comprises pre-parsing the script using a grammar that is simpler than the grammar used in fully parsing the parts of the script.

39. The non-transitory processor-readable storage medium of claim 37, wherein the stored processor-executable instructions are configured to cause a processor to perform operations to perform operations further comprising:
- caching the generated bytecode.

40. The non-transitory processor-readable storage medium of claim 37, wherein the stored processor-executable instructions are configured to cause a processor to perform operations such that pre-parsing the script comprises pre-parsing the script in a parallel processing operation.

* * * * *